J. R. TURNER & J. JACOBS.
Subsoil Plows.

No. 144,487. Patented Nov. 11, 1873.

Witnesses:
E. Wolff
Sedgwick

Inventor:
J. R. Turner
J. Jacobs
Per
Attorneys.

UNITED STATES PATENT OFFICE.

JOHN R. TURNER AND JACOB JACOBS, OF FREDERICKTOWN, MISSOURI.

IMPROVEMENT IN SUBSOIL-PLOWS.

Specification forming part of Letters Patent No. 144,487, dated November 11, 1873; application filed September 13, 1873.

*To all whom it may concern:*

Figure 1:
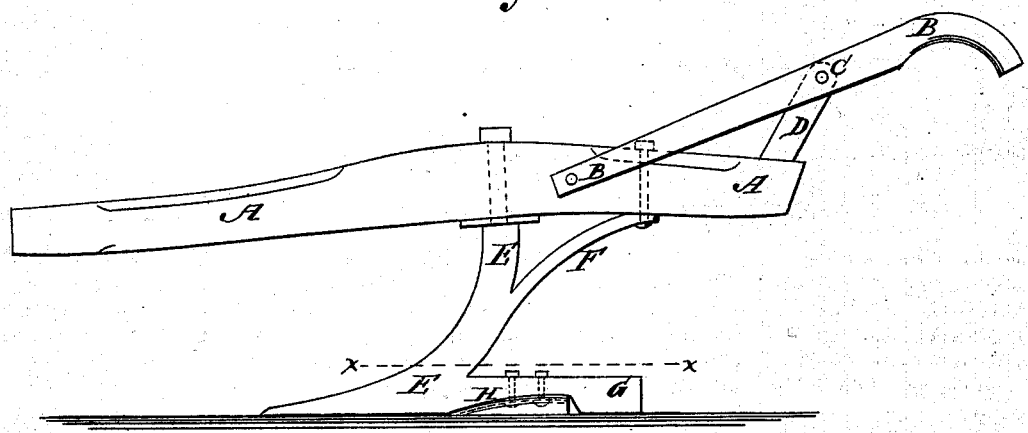
Figure 2:
Figure 3:

Be it known that we, JOHN R. TURNER and JACOB JACOBS, of Fredericktown, in the county of Madison and State of Missouri, have invented a new and useful Improvement in Subsoil-Plows, of which the following is a specification:

Figure 1 is a side view of our improved subsoil-plow. Fig. 2 is a horizontal section of the same, taken through the line $x\ x$, Fig. 1; and Fig. 3 is a top view of a half-shovel.

Our invention has for its object to furnish an improved subsoil-plow which shall be so constructed as to run easily and steadily through the hardest soil, and loosen it thoroughly. The invention consists in the notched base-bar and the shovel, constructed and combined with each other, and with the cutter of a subsoil-plow, in the manner hereinafter fully described.

A is the plow-beam. B are the handles, the forward ends of which are secured to the opposite sides of the beams A. The handles B are supported in proper position by a round, C, which passes through the upper end of the upright D, the lower end of which is attached to the rear end of the beam A. E is the standard, the upper end of which is secured to the beam A, and the draft-strain upon it is sustained by a brace, F, formed upon or attached to it, and the rear end of which is secured to the rear part of beam A. The standard E curves forward as it projects downward, and is made thin, with its forward edge sharp, to enable it to pass readily through the ground. The base of the cutter E is made with a bar, G, extending to the rearward. Upon the under side of the bar G is formed a notch or recess, into which is fitted the convex upper side of the shovel H, which is securely bolted to said bar G, as shown in the drawings.

With this construction, as the plow is drawn through the ground, the shovel H loosens the soil and breaks it up, leaving it light and loose without removing it from its place.

For some purposes the shovel H may be made in the form of a half-shovel, as shown in Fig. 3.

Having thus described our invention, we claim as new and desire to secure by Letters Patent—

The notched bar G and shovel H, constructed and combined with each other, and with the cutter E of a subsoil-plow, substantially in the manner herein shown and described.

JOHN R. TURNER.
JACOB JACOBS.

Witnesses:
L. H. GALE,
J. G. LACKEY.